United States Patent
Babu et al.

(10) Patent No.: US 10,548,107 B2
(45) Date of Patent: Jan. 28, 2020

(54) DELAYING CELLULAR RE-REGISTRATION DURING CRITICAL CONDITIONS

(71) Applicant: Apple Inc., Cupertino, CA (US)

(72) Inventors: Shivani Suresh Babu, San Jose, CA (US); Krisztian Kiss, Hayward, CA (US); Lakshmi N. Kavuri, San Jose, CA (US); Srinivasan Nimmala, San Jose, CA (US); Yifan Zhu, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/181,711

(22) Filed: Nov. 6, 2018

(65) Prior Publication Data
US 2019/0306823 A1 Oct. 3, 2019

Related U.S. Application Data

(60) Provisional application No. 62/650,021, filed on Mar. 29, 2018.

(51) Int. Cl.
*H04W 60/04* (2009.01)
*H04W 24/08* (2009.01)
(Continued)

(52) U.S. Cl.
CPC ............ *H04W 60/04* (2013.01); *H04W 24/08* (2013.01); *H04W 84/042* (2013.01)

(58) Field of Classification Search
CPC ... H04W 60/04; H04W 24/08; H04W 84/042; H04W 24/02; H04W 24/10;
(Continued)

(56) References Cited

U.S. PATENT DOCUMENTS 9,215,610 B2 12/2015 Mach
9,872,328 B2 1/2018 Ratcliffe
(Continued)

FOREIGN PATENT DOCUMENTS

WO WO2018169523 A1 9/2018

OTHER PUBLICATIONS

3GPP TS 23.502 v15.3.0 3rd Generation Partnership Project; Technical Specification Group Servers and System Aspects; Procedures for the 5G System; Stage 2 (Release 15) (Sep. 2018) (Year: 2018).*

(Continued)

*Primary Examiner* — Matthew C Sams
(74) *Attorney, Agent, or Firm* — Kowert Hood Munyon Rankin and Goetzel PC; Jeffrey C. Hood (57) ABSTRACT

This disclosure relates to techniques for network delaying cellular re-registration during critical conditions. A wireless device may register for cellular service with a cellular network. The wireless device may receive a configuration update command from a network element of the cellular network. The configuration update command may request re-registration of the wireless device. The wireless device may determine to delay responding to the configuration update command based at least in part on one or more conditions in effect at the wireless device. For example, one possible such condition may include if a protocol data unit session associated with emergency services is active at the wireless device.

20 Claims, 5 Drawing Sheets

(51) Int. Cl.
*H04W 84/08* (2009.01)
*H04W 84/04* (2009.01)

(58) Field of Classification Search
CPC ......... H04W 28/0236; H04W 28/0268; H04W 36/14; H04W 48/16; H04W 60/06; H04W 68/005; H04W 72/1257; H04W 76/12; H04W 76/20; H04W 76/27; H04W 76/30; H04W 80/10; H04W 84/12; H04W 88/02; H04W 8/02; H04W 8/18; H04W 8/20; H04L 12/14
See application file for complete search history.

(56) References Cited

U.S. PATENT DOCUMENTS

| | | | | |
|---|---|---|---|---|
| 10,375,665 | B2* | 8/2019 | Li | |
| 2008/0031133 | A1* | 2/2008 | Kendall | H04L 1/1607 370/231 |
| 2012/0120802 | A1* | 5/2012 | Mach | H04W 28/02 370/235 |
| 2013/0163434 | A1* | 6/2013 | Hamel | H04W 60/06 370/237 |
| 2015/0119034 | A1 | 4/2015 | Li | |
| 2016/0150393 | A1* | 5/2016 | Ratcliffe | H04W 76/38 455/435.1 |
| 2016/0285762 | A1* | 9/2016 | Chen | H04L 41/0816 |
| 2018/0097541 | A1* | 4/2018 | Bhattad | H04W 68/00 |
| 2018/0227872 | A1* | 8/2018 | Li | H04W 76/20 |
| 2018/0262924 | A1* | 9/2018 | Dao | H04W 24/02 |
| 2018/0263068 | A1* | 9/2018 | Chiang | H04W 36/0022 |
| 2018/0332523 | A1* | 11/2018 | Faccin | H04W 36/14 |
| 2018/0376446 | A1* | 12/2018 | Youn | H04W 8/20 |
| 2019/0166647 | A1* | 5/2019 | Velev | H04W 76/12 |
| 2019/0253917 | A1* | 8/2019 | Dao | H04L 12/14 |

OTHER PUBLICATIONS

Extended European Search Report, European Patent Application 19154775.1, dated Jul. 3, 2019, 11 pages.

Oppo et al.; "Clarification on NSSAI configuration"; S2-181883; 3rd Generation Partnership Project (3GPP), Mobile Competence Centre; 650, Route Des Lucioles; F-06921 Sophia-Antipolis Cedex; France; vol. SA WG2, No. Montreal, Canada; Feb. 20, 2018; three pages.

"3rd Generation Partnership Project; Technical Specification Group Core Network and Terminals; Non-Access-Stratum (NAS) protocol for 5G System (5GS); Stage 3 (Release 15)", 3GPP Standard; Technical Specification; 3GPP TS 24.501, 3rd Generation Partnership Project (3GPP), Mobile Competence Centre; 650, Route Des Lucioles; F-06921 Sophia-Antipolis Cedex; France; vol. CT WG1, No. V1 .0.0; Mar. 15, 2018; 253 pages.

Orange; "Re-registration procedure for user currently registered"; 3GPP Draft; S2-022529; 3rd Generation Partnership Project (3GPP), Mobile Competence Centre; 650, Route Des Lucioles; F-06921 Sophia-Antipolis Cedex; France; vol. TSG SA, No. Toronto, Canada; Aug. 19-23, 2002; four pages.

Qualcomm Incorporated et al.; "TS 23.502: Network triggered re-registration via UE Configuration update procedure"; S2-176675 (was S2-175711); 3rd Generation Partnership Project (3GPP), Mobile Competence Centre; 650, Route Des Lucioles; F-06921 Sophia-Antipolis Cedex; France; vol. SA WG2, No. Sophia Antipolis, France; Aug. 29, 2017; five pages.

Oppo et al.; "Clarification on NSSAI configuration"; S2-182924 (was S2-181883); 3rd Generation Partnership Project (3GPP), Mobile Competence Centre; 650, Route Des Lucioles; F-06921 Sophia-Antipolis Cedex; France; vol. SA WG2, No. Montreal, Canada; Mar. 19, 2018; 11 pages.

"3rd Generation Partnership Project; Technical Specification Group Services and System Aspects; Procedures for the 5G System; Stage 2 (Release 15)", 3GPP Standard; Technical Specification; 3GPP TS 23.502 V15.1.0, 3rd Generation Partnership Project (3GPP), Mobile Competence Centre; 650 Route Des Lucioles; F-06921 Sophia-Antipolis Valbonne; France; Mar. 27, 2018; 285 pages.

* cited by examiner

DELAYING CELLULAR RE-REGISTRATION DURING CRITICAL CONDITIONS

PRIORITY INFORMATION

This application claims priority to U.S. provisional patent application Ser. No. 62/650,021, entitled "Delaying Cellular Re-registration During Critical Conditions," filed Mar. 29, 2018, which is hereby incorporated by reference in its entirety as though fully and completely set forth herein.

FIELD

The present application relates to apparatuses, systems, and methods for delaying cellular re-registration during critical conditions.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications.

To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

At least in some instances, a cellular configuration update may request or ortherwise trigger re-registration by a wireless device receiving the configuration update. For example, in 5G NR, re-registration may be expected in response to a configuration update command providing updated configured and/or allowed network slice selection assistance information. Any active protocol data unit sessions may generally be released by the wireless device in conjunction with such re-registration. This could include interrupting emergency services and/or other critical communication sessions.

To avoid interruption of such critical communication sessions, embodiments are presented herein of apparatuses, systems, and methods for delaying cellular re-registration during critical conditions.

The techniques described herein include network- and device-side approaches to delaying cellular re-registration during critical conditions. For a network-side approach, the network may determine whether or when to provide a configuration update that would trigger re-registration based at least in part on whether any critical conditions are in effect. For example, the network may delay providing such a configuration update if a critical condition is in effect at the wireless device, and may proceed to provide such a configuration update if no critical conditions are in effect at the wireless device. What constitutes a critical condition could be configured by the network operator, e.g., to include emergency calls and/or any of various other possible conditions, as desired.

For a device-side approach, a wireless device may determine at what time to respond to a configuration update that triggers re-registration, or at least at what time to perform the requested re-registration, based at least in part on whether any critical conditions are in effect at the wireless device. For example, the wireless device may delay responding to such a configuration update (or may at least delay the re-registration) if a critical condition is in effect at the wireless device, and may proceed to respond to such a configuration update and perform the requested re-registration if no critical conditions are in effect at the wireless device. What constitutes a critical condition could be configured by the wireless device, or indicated by the network operator in configuration information, among various possibilities, and may similarly potentially include emergency calls and/or any of various other possible conditions.

Thus, by providing a mechanism for delaying re-registration while critical conditions are occurring, it may be possible to avoid (or at least reduce the likelihood of) interrupting highly important communication activities such as an emergency services or other mission critical communication because of the re-registration, at least according to some embodiments.

The techniques described herein may be implemented in and/or used with a number of different types of devices, including but not limited to cellular phones, tablet computers, wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Cell—The term "cell" as used herein may refer to an area in which wireless communication services are provided on a radio frequency by a cell site or base station. A cell may be identified in various instances by the frequency on which the cell is deployed, by a network (e.g., PLMN) to which the cell belongs, and/or a cell identifier (cell id), among various possibilities.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/ receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1:
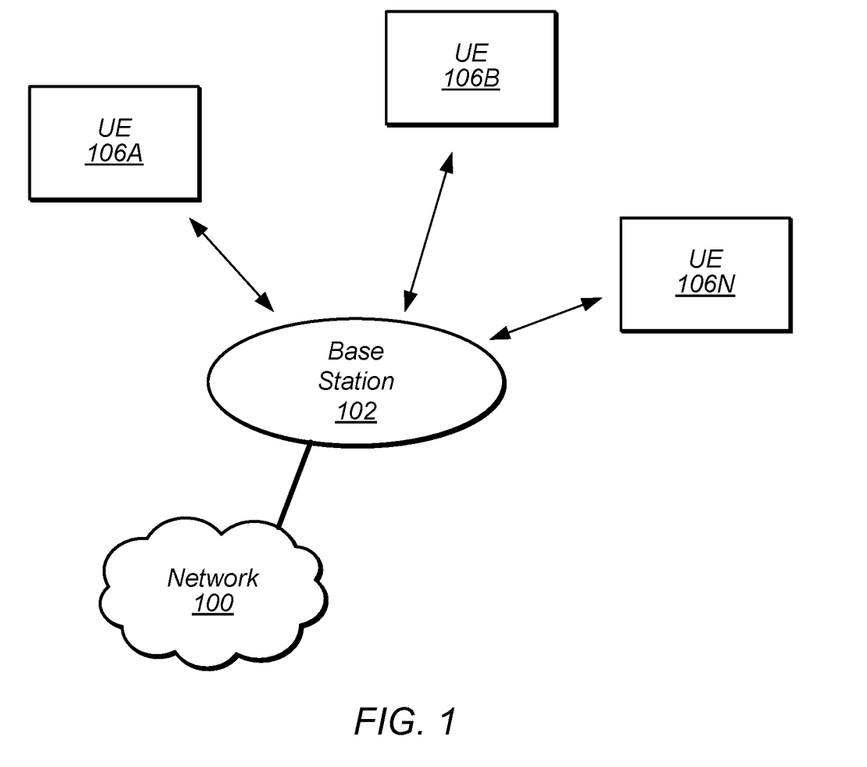
FIG. 1 illustrates an exemplary (and simplified) wireless communication system, according to some embodiments.
Figure 2:
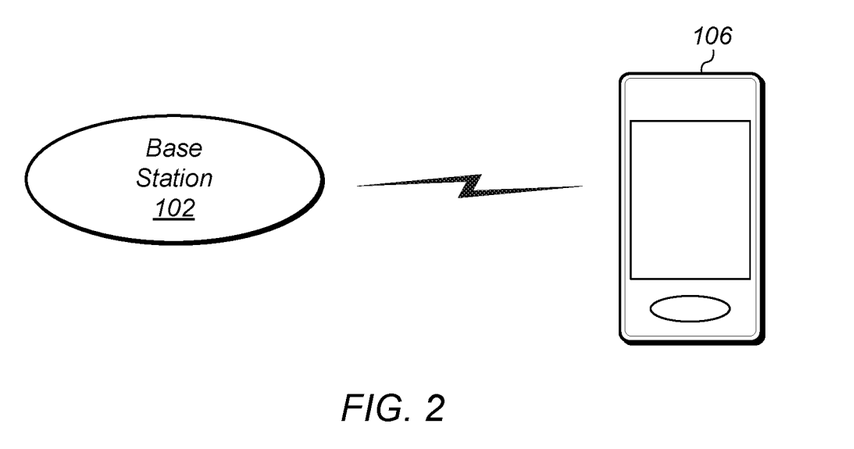
FIG. 2 illustrates an exemplary base station (BS) in communication with an exemplary wireless user equipment (UE) device, according to some embodiments.

FIGS. 1 and 2—Communication System

FIG. 1 illustrates an exemplary (and simplified) wireless communication system in which aspects of this disclosure may be implemented, according to some embodiments. It is noted that the system of FIG. 1 is merely one example of a possible system, and embodiments of the disclosure may be implemented in any of various systems, as desired.

As shown, the exemplary wireless communication system includes a base station 102 which communicates over a transmission medium with one or more (e.g., an arbitrary number of) user devices 106A, 106B, etc., through 106N. Each of the user devices may be referred to herein as a "user equipment" (UE). Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB'. If the base station 102 is implemented in the context of 5G NR, it may alternately be referred to as an 'gNodeB'. The base station 102 may also be equipped to communicate with a network 100. For example, the network 100 may include a core network (potentially including any number of core network slices) of a cellular service provider (e.g., a public land mobile network (PLMN)). Alternatively or in addition, the network 100 may include (or be coupled to) a telecommunication network such as a public switched telephone network (PSTN), the Internet, and/or various possibilities). Thus, the base station 102 may facilitate communication among the user devices and/or between the user devices and the network 100.

The communication area (or coverage area) of the base station may be referred to as a "cell." The base station 102 and the UEs 106 may be configured to communicate over the transmission medium using any of various radio access technologies (RATs), wireless communication technologies, or telecommunication standards, such as GSM, UMTS (WCDMA, TD-SCDMA), LTE, LTE-Advanced (LTE-A), 5G NR, 3GPP2 CDMA2000 (e.g., 1×RTT, 1×EV-DO, HRPD, eHRPD), Wi-Fi, WiMAX etc.

Base station 102 and other similar base stations operating according to the same or a different cellular communication standard may thus be provided as a network of cells, which may provide continuous or nearly continuous overlapping service to UEs 106A-N and similar devices over a geographic area via one or more cellular communication standards. In other words, at least according to some embodiments, the base station 102 may function as a node in the radio access network (RAN) of a cellular network operator.

Thus, while base station 102 may act as a "serving cell" for UEs 106A-N as illustrated in FIG. 1, each UE 106 may also be capable of receiving signals from (and possibly within communication range of) one or more other cells (which might be provided by other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. Other configurations are also possible.

Note that a UE 106 may be capable of communicating using multiple wireless communication standards. For example, a UE 106 might be configured to communicate using two or more of GSM, UMTS, CDMA2000, LTE, LTE-A, NR, WLAN, Bluetooth, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

In some embodiments, the UE 106 may be configured to communicate using any of multiple RATs. For example, the UE 106 may be configured to communicate using two or more of GSM, UMTS, CDMA2000, LTE, LTE-A, NR, WLAN, or GNSS. Other combinations of wireless communication technologies are also possible.

The UE 106 may include one or more antennas for communicating using one or more wireless communication protocols or technologies. In one embodiment, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 might include a shared radio for communicating using either of LTE or 1×RTT (or LTE or GSM, or LTE or NR, etc.), and separate radios for communicating using each of Wi-Fi and Bluetooth. Other configurations are also possible.

Figure 3:
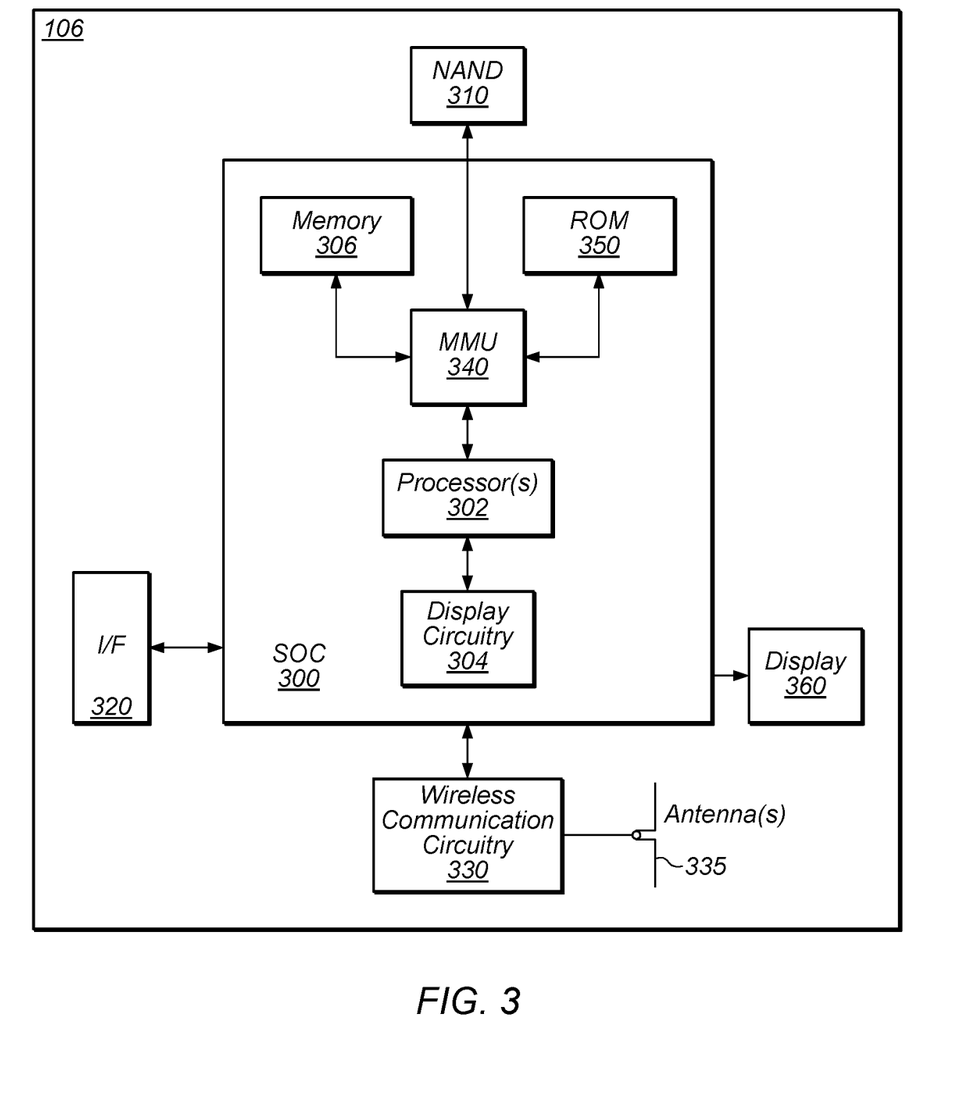
FIG. 3 illustrates an exemplary block diagram of a UE device, according to some embodiments.

FIG. 3—Exemplary Block Diagram of a UE

FIG. 3 illustrates an exemplary block diagram of a UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry (e.g., radio) 330 (e.g., for LTE, NR, Wi-Fi, GPS, etc.).

As noted above, the UE 106 may be configured to communicate wirelessly using multiple wireless communication technologies. As further noted above, in such instances, the wireless communication circuitry 330 may include radio components which are shared between multiple wireless communication technologies and/or radio components which are configured exclusively for use according to a single wireless communication technology. As shown, the UE device 106 may include at least one antenna (and possibly multiple antennas, e.g., for MIMO and/or for implementing different wireless communication technologies, among various possibilities), for performing wireless communication with cellular base stations and/or other devices. For example, the UE device 106 may use antenna(s) 335 to perform the wireless communication.

As described further subsequently herein, the UE 106 may include hardware and/or software components for implementing and/or supporting implementation of features described herein. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein.

Figure 4:
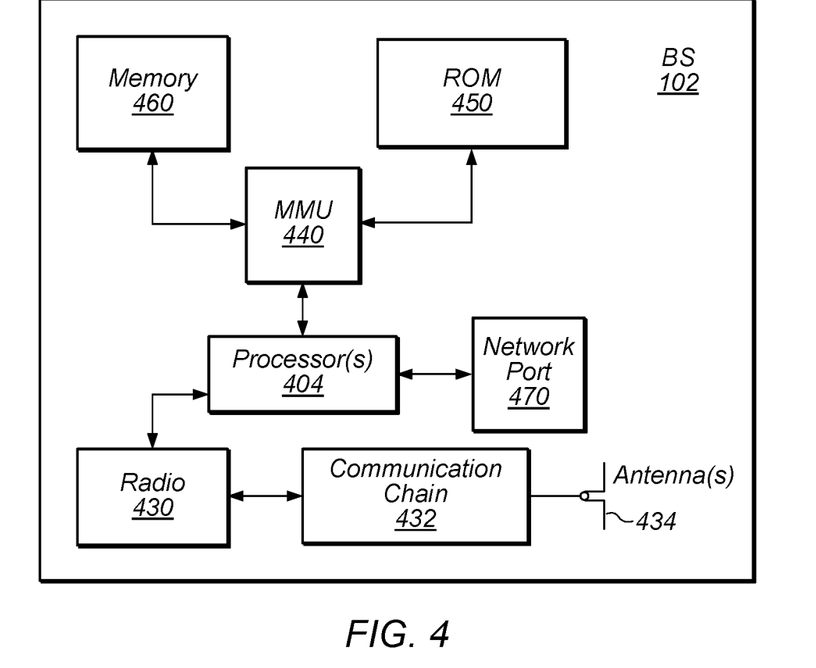
FIG. 4 illustrates an exemplary block diagram of a BS, according to some embodiments.

FIG. 4—Exemplary Block Diagram of a Base Station

FIG. 4 illustrates an exemplary block diagram of a base station 102. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to any of various possible cellular network entities, e.g., including one or more core network instances or core network slices of a cellular service provider, a network slice selection function, an access and mobility management function, a session management function, and/or various other possible cellular network entities. The core network(s) may provide mobility related services and/or other services to a plurality of devices, such as UE devices 106. In some cases, the network port 470 may couple to a telephone network via the core network(s), and/or the core network(s) may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, NR, UMTS, CDMA2000, Wi-Fi, etc.

The BS 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., NR and LTE, NR and Wi-Fi, LTE and Wi-Fi, LTE and UMTS, LTE and CDMA2000, UMTS and GSM, etc.).

The BS 102 may be configured to act as a node of a radio access network (RAN) of a cellular network. Thus, the BS 102 may provide radio access to the cellular network (e.g., including one or more core network instances, as previously noted) to wireless devices. According to some embodiments, the BS 102 may be configured to implement multiple possible RAN slices, e.g., to accommodate different scenarios with respect to RAN functionality, performance, isolation, etc. The different RAN slices may include different sets of RAN functions, and/or differently configured RAN functions (e.g., having different resource pools, etc.).

As described further subsequently herein, the BS 102 may include hardware and software components for implementing and/or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

Figure 5:
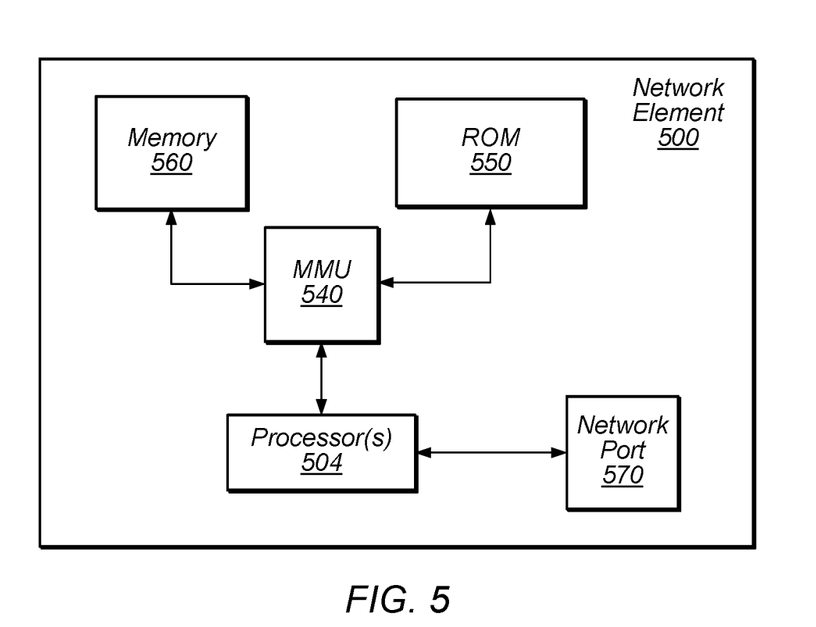
FIG. 5 illustrates an exemplary block diagram of a core network element, according to some embodiments.

FIG. 5—Exemplary Block Diagram of a Network Element

FIG. 5 illustrates an exemplary block diagram of a network element 500, according to some embodiments. According to some embodiments, the network element 500 may implement one or more logical functions/entities of a cellular core network, such as an access and mobility management function (AMF) or mobility management entity (MME), a session management function (SMF), a serving gateway (S-GW), a network slice selection function (NSSF) entity, etc. It is noted that the network element 500 of FIG. 5 is merely one example of a possible network element 500. As shown, the core network element 500 may include processor(s) 504 which may execute program instructions for the core network element 500. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The network element 500 may include at least one network port 570. The network port 570 may be configured to couple to one or more base stations and/or other cellular network entities and/or devices. The network element 500 may communicate with base stations (e.g., eNBs) and/or other network entities/devices by means of any of various communication protocols and/or interfaces.

As described further subsequently herein, the network element 500 may include hardware and software components for implementing and/or supporting implementation of features described herein. The processor(s) 504 of the core network element 500 may be configured to implement or support implementation of part or all of the methods described herein, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof.

FIGS. 6-10—Wireless Device Configuration Updates and Re-Registration

Network slicing is a concept that may enable a cellular network operator to create customized networks to provide solutions for different market scenarios that have diverse requirements, e.g., in the areas of functionality, performance and isolation. For example, a cellular network may provide multiple network slices, of which each network slice may include a set of network functions (NFs) selected to provide some specific telecommunication service(s) and network capabilities, and the resources to run these NFs.

A cellular communication system may typically utilize a registration process to initially register a wireless device to communicate using the cellular communication system. Such a registration process may include any of various aspects, potentially including any or all of establishing context information, performing authentication and security procedures, obtaining access to one or more network slices, and/or any of various other aspects.

Figure 6:
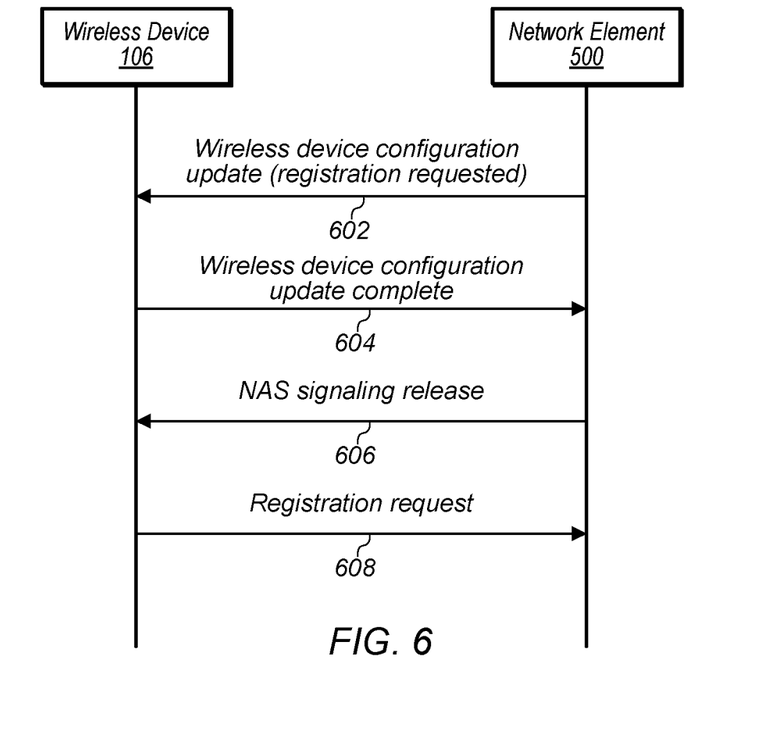
FIGS. 6-10 are communication and flowchart diagrams illustrating exemplary aspects of various possible approaches to performing wireless device configuration updates and re-registration, according to some embodiments.

In some circumstances, it may further be the case that a wireless device that is registered with a cellular communication system may perform a registration update, e.g., to re-register with the cellular communication system. For example, 3GPP 5G NR specification documents may specify (e.g., in 3GPP TS 24.501, as one possibility) that a wireless device may or must perform re-registration when it receives updated (e.g., configured or allowed) network slice selection assistance information (NSSAI) in a UE configuration update procedure. In such a scenario, it may further be the case that the wireless device is expected to locally release any protocol data unit (PDU) sessions. FIG. 6 is a communication flow diagram illustrating a communication sequence in which such an exchange may occur.

As shown, in 602, a network element 500 (e.g., an AMF in a 5G NR scenario, as one possibility) may provide a wireless device 106 with a wireless device configuration update command message that includes a re-registration request IE. For example, the configuration update command may include an updated allowed NSSAI parameter, and/or an updated configured NSSAI parameter.

In 604, the wireless device 106 may respond with a wireless device configuration update indication.

In 606, the network element 500 may release the non-access stratum (NAS) signaling connection between the wireless device 106 and the network element 500, e.g., since registration was requested in the wireless device configuration update command.

In 608, the wireless device 106 may transmit a registration request to the network element 500, e.g., based on the wireless device configuration update command that requested registration. The registration request may initiate the process of re-registering the wireless device 106 in accordance with the updated allowed or configured NSSAI. The wireless device 106 may consider the old allowed or configured NSSAI to be invalid, and may release at least any PDU sessions associated with S-NSSAI(s) not included in the allowed/configured NSSAI.

Thus, the wireless device 106 may be forced to deactivate any ongoing operations by way of a configuration update command with re-registration requested. For example, an emergency or other call (e.g., in which case the call could be dropped), and/or one or more other mission critical operations, could be interrupted by such a configuration update, at least in some scenarios.

It may be possible, at least in some instances, for release of the NAS signaling connection to be delayed by the network element 500, e.g., for updated allowed NSSAI. However, this may not prevent the wireless device from deactivating identity information (e.g., a globally unique temporary identifier (GUTI)) that was associated with the previous registration and considering the previous allowed NSSAI as invalid and thus locally releasing any (e.g., potentially critical) PDU sessions. Further, such delaying may not be supported for updated configured NSSAI. It may be desirable, at least in some instances, to provide a mechanism that can support avoiding releasing a session that is associated with a slice that is no longer available for critical sessions. Similarly, as S-NSSAI may not be required to be sent by a UE when establishing an emergency PDU session, it may be preferable to avoid releasing an emergency session even if there is updated NSSAI for the UE. However, there is currently no existing mechanism for delaying a configuration update command that is to be provided to a wireless device or otherwise preventing release of PDU sessions that are considered critical when such a configuration update command is provided.

Thus, it may be beneficial to provide such a mechanism, e.g., to avoid or reduce the likelihood of interruptions to critical operations due to configuration updates requiring re-registration, at least in some instances. Accordingly, FIGS. 7-8 are flowchart diagrams illustrating methods for delaying re-registration during critical conditions.

Figure 7:
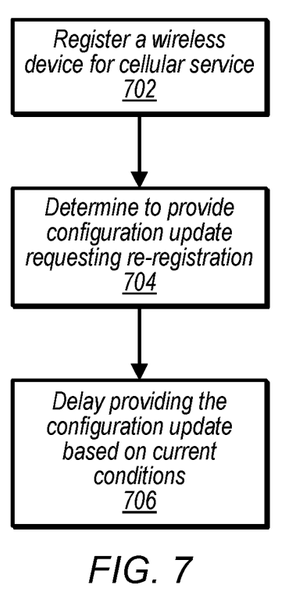
Figure 8:
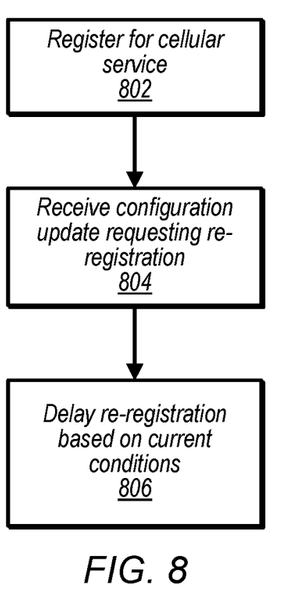

FIG. 7 illustrates a method for a cellular network to delay re-registration during critical conditions. Aspects of the method of FIG. 7 may be implemented by a cellular network element (e.g., in conjunction with a wireless device), such as network element 500 illustrated in and described with respect to various of the Figures herein, or more generally in conjunction with any of the computer systems or devices shown in the above Figures, among other devices, as desired. Note that while at least some elements of the method of FIG. 7 are described in a manner relating to the use of communication techniques and/or features associated with NR and/or 3GPP specification documents, such description is not intended to be limiting to the disclosure, and aspects of the method of FIG. 7 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 7 may operate as follows.

In 702, a wireless device may be registered for cellular service with a cellular network. The wireless device may access the cellular network by way of a radio access network (RAN) provided by the cellular network, e.g., which may include cellular base stations that provide an over-the-air interface for wireless communication between the wireless device and the cellular base stations. The cellular network may further include a core network (CN) (which may include various core network slices) that may include various network elements that provide a variety of functions/services to wireless devices communicatively coupled to the cellular network.

Once registered, the wireless device may perform wireless communication with the cellular network, which may include one or more data sessions for communicating data for one or more applications and/or functions executing at the wireless device. For example, the wireless device might communicate data for a voice call (e.g., which could be an emergency call or a non-emergency call), an email application, a web browser application, a video streaming application, a productivity application, a messaging application, and/or for any of various other possible purposes.

In 704, a network element (e.g., an AMF) serving the wireless device may determine to provide a configuration update command to the wireless device that requests re-registration of the wireless device. For example, the configuration update command may modify a set of network slices for the wireless device, such as by including updated allowed or configured NSSAI for the wireless device.

The network element may determine whether to provide the configuration update command immediately or to delay providing the configuration update. The decision may be made based at least in part on whether certain conditions are in effect at the wireless device, in response to which, the network element is configured to delay providing such a configuration update command. For example, conditions in which one or more communication activities are occurring that may particularly important to avoid interrupting may be defined as critical conditions at the wireless device. The network element may be able to determine if such conditions are in effect based on the type(s) of communication activity (e.g., as represented by one or more bearer types and/or any of various other information available to the network element) currently being performed between the wireless device and the cellular network. For example, if an emergency call (or any other protocol data unit session associated with emergency services) is occurring, this may be considered a critical condition. Any number of other types of communication activities may similarly be considered critical conditions, e.g., depending on the configuration of the cellular network and/or the configuration of the wireless device.

In 706, the network element may delay providing the configuration update command based on the current conditions, e.g., if the network element determines that the wireless device is in a critical condition. For example, the network element may choose to not provide the configuration update command to the wireless device until the critical condition is no longer in effect at the wireless device, and/or until one or more other specified conditions are met.

Note that if desired, the amount of time that the network element chooses to delay providing a configuration update command in such circumstances may be limited, e.g., by a timer. For example, the network element may initiate a timer upon determining to delay providing the configuration update, and the network element may provide the configuration update (e.g., triggering the wireless device to perform re-registration) at expiration of the timer, e.g., even if the wireless device has not yet exited the critical condition at that time. This may reduce the likelihood of a critical communication being interrupted by such a configuration update while preventing indefinite delay to provision of the configuration update command. However, it may still be possible for a critical communication to be interrupted by such a configuration update command if such a timer is implemented.

Once the network element has determined to no longer delay providing the configuration update command (e.g., due to a timer associated with the delay expiring, to the wireless device exiting the critical condition, or based on any of various other possible considerations), the network element may provide the configuration update command, based on which the wireless device may proceed to perform re-registration, at least in some instances.

Such a method may allow the cellular network to determine what conditions are considered critical and to determine whether to delay re-registration (e.g., by delaying providing a configuration update command that requests re-registration), and if so, for how long to delay re-registration. As another option, it may be possible for the wireless device to determine what conditions are considered critical and whether (e.g., and potentially how long) to delay re-registration of the wireless device. FIG. 8 illustrates such a method for a wireless device to delay responding to a configuration update command that requires re-registration during critical conditions.

Aspects of the method of FIG. 8 may be implemented by a wireless device (e.g., in conjunction with one or more cellular network elements), such as a UE 106 illustrated in and described with respect to various of the Figures herein, or more generally in conjunction with any of the computer systems or devices shown in the above Figures, among other devices, as desired. Note that while at least some elements of the method of FIG. 8 are described in a manner relating to the use of communication techniques and/or features associated with NR and/or 3GPP specification documents, such description is not intended to be limiting to the disclosure, and aspects of the method of FIG. 8 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 8 may operate as follows.

In 802, a wireless device may register for cellular service, e.g., with a cellular network. The wireless device may access the cellular network by way of a radio access network (RAN) provided by the cellular network, e.g., which may include cellular base stations that provide an over-the-air interface for wireless communication between the wireless device and the cellular base stations. The cellular network may further include a core network (CN) (which may include various core network slices) that may include various network elements that provide a variety of functions/services to wireless devices communicatively coupled to the cellular network.

Once registered, the wireless device may perform wireless communication with the cellular network, which may include one or more data sessions for communicating data for one or more applications and/or functions executing at the wireless device. For example, the wireless device might communicate data for a voice call (e.g., which could be an emergency call or a non-emergency call), an email application, a web browser application, a video streaming application, a productivity application, a messaging application, and/or for any of various other possible purposes.

In 804, the wireless device may receive a configuration update command requesting re-registration of the wireless device, e.g, from a network element of the cellular network. For example, the configuration update command may modify a set of network slices for the wireless device, such as by including updated allowed and/or configured NSSAI for the wireless device.

The wireless device may determine whether to respond immediately to the configuration update command or to delay responding, and/or whether to delay performing the re-registration. The decision may be made based at least in part on whether certain conditions are in effect at the wireless device in response to which the wireless device is configured to delay responding to such a Configuration update command by not sending UE Configuration Update Complete, or to delay performing the re-registration. For example, conditions in which one or more communication activities are occurring that may be particularly important to avoid interrupting may be defined as critical conditions at the wireless device. The wireless device may be able to determine if such conditions are in effect based on the type(s) of communication activity currently being performed by the wireless device. For example, if an emergency call (or any other protocol data unit session associated with emergency services) is occurring, this may be considered a critical condition. Any number of other types of communication activities may similarly be considered critical conditions, e.g., depending on the configuration of the wireless device.

In 806, the wireless device may delay responding to the configuration update command with re-registration required, and/or may delay performing the re-registration, based on the current conditions, e.g., if the wireless device determines that the wireless device is in a critical condition. For example, the wireless device may choose to not respond to the configuration update command provided by the network element until the critical condition is no longer in effect at the wireless device, and/or until one or more other specified conditions are met. As another possibility, the wireless device may acknowledge the configuration update command, but may delay performing the re-registration until the critical condition is no longer in effect at the wireless device, and/or until one or more other specified conditions are met.

Note that if desired, the amount of time that the wireless device chooses to delay responding to a configuration update command and/or performing re-registration in such circumstances may be limited, e.g., by a timer. For example, the wireless device may initiate a timer upon determining to delay responding to the configuration update command or performing re-registration, and the wireless device may respond to the configuration update and/or proceed to perform re-registration at expiration of the timer, e.g., even if the wireless device has not yet exited the critical condition at that time. This may reduce the likelihood of a critical communication being interrupted by such a configuration update command while preventing the wireless device from delaying re-registration indefinitely. However, it may still be possible for a critical communication to be interrupted by such a configuration update command if such a timer is implemented.

Once the wireless device has determined to no longer delay re-registration (e.g., due to a timer associated with the delay expiring, to the wireless device exiting the critical condition, or based on any of various other possible considerations), the wireless device may proceed to perform re-registration (e.g., including responding to the configuration update command if it has not already done so), at least in some instances.

Note that if no conditions configured to cause the wireless device to delay re-registration are in effect at the wireless device when the configuration update command is received, the wireless device may transmit the response to the configuration update command and perform re-registration immediately (e.g., at the next available opportunity) after receiving the configuration update command.

Figure 9:
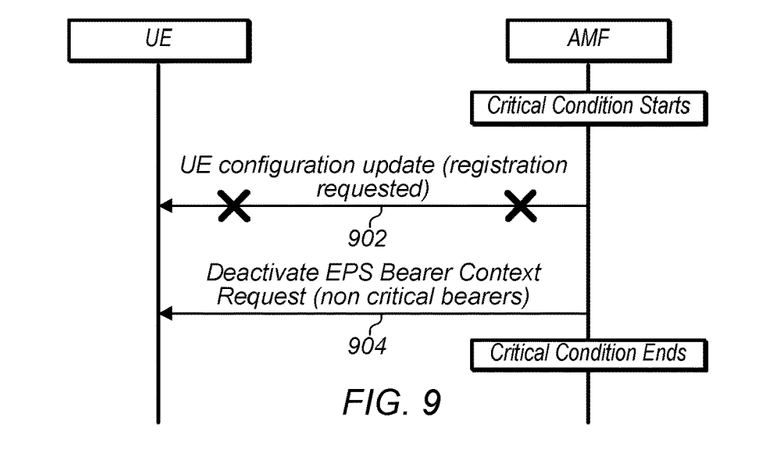
Figure 10:
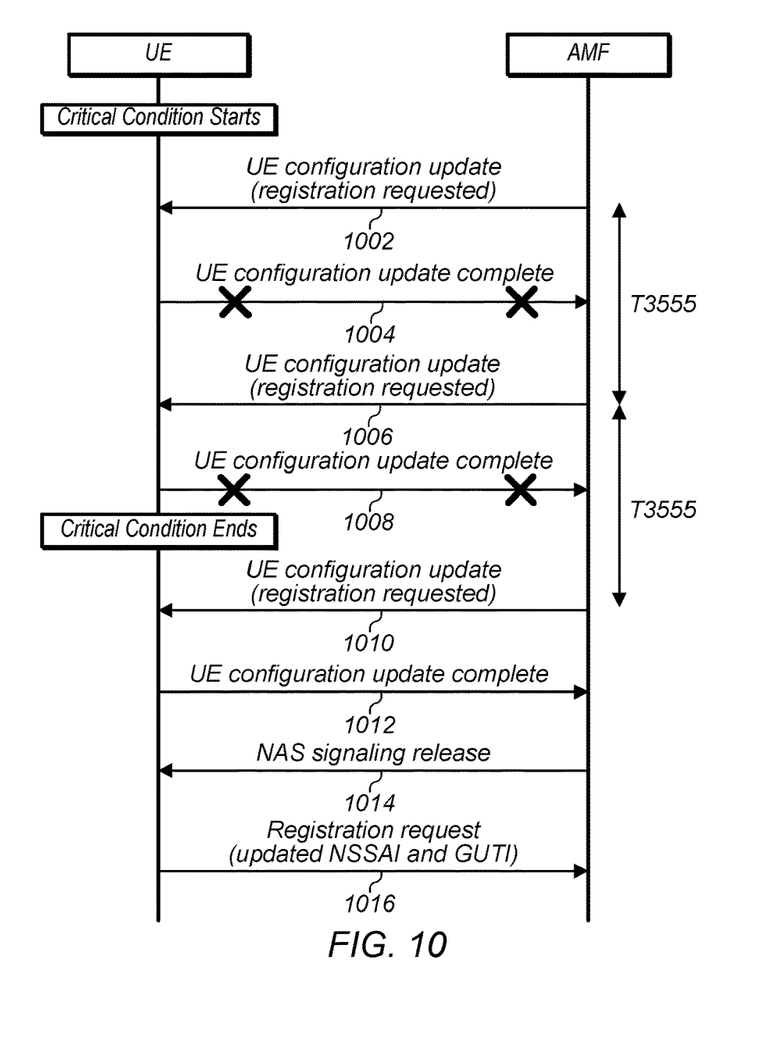

FIGS. 9-10 are communication flow diagrams illustrating possible further details of methods that could be used for delaying wireless device re-registration during critical conditions, according to some embodiments. Note that FIGS. 9-10 and the following information are provided as being illustrative of further considerations and possible implementation details relating to the methods of FIGS. 7-8, and are not intended to be limiting to the disclosure as a whole. Numerous variations and alternatives to the details provided herein below are possible and should be considered within the scope of the disclosure.

As previously noted herein, one possibility for delaying wireless device re-registration during critical conditions may include implementing a mechanism for such delay on the cellular network side. FIG. 9 illustrates a communication flow diagram in accordance with such a mechanism in a possible 5G NR context. In the illustrated scenario, the AMF may determine if any critical operation is ongoing at the UE. A 'critical' operation may be defined to include any of various possible operations, as desired. One possibility may include an active bearer for "emergency". Other possibilities may include services with 5QI 70 (mission critical data) or multimedia priority service (MPS) activity, at least according to some embodiments.

In the illustrated scenario, it may be the case that there is such a critical operation ongoing at the UE. As such, in 902, the AMF may refrain from sending a UE configuration update command requiring re-registration to the UE. In 904, the AMF may deactivate all PDU sessions that were not allocated for critical services. The AMF may follow up, sending the UE configuration update command requiring re-registration, after criticality ceases.

Note that, at least according to some instances, such operation may be similar to possible mechanisms for handling detach requests during active PDU sessions for emergency services. For example, for de-registration and/or detach requests, AMF and/or MME entities refrain from sending such messages to a UE that has bearers for emergency services, at least according to some embodiments.

As also previously noted, another possibility for delaying wireless device re-registration during critical conditions may include implementing a mechanism for such delay on the wireless device side. FIG. 10 illustrates a communication flow diagram in accordance with such a mechanism in a possible 5G NR context. In the illustrated scenario, the UE may determine if any critical operation is ongoing at the UE. As previously noted, a 'critical' operation may be defined to include any of various possible operations, as desired. One possibility may include an active bearer for "emergency". Other possibilities may include services with 5QI 70 (mission critical data) or multimedia priority service (MPS) activity, at least according to some embodiments.

In the illustrated scenario, it may be the case that there is such a critical operation ongoing at the UE, when, in 1002, the AMF provides a UE configuration update command requiring re-registration to the UE. Based on the critical condition, in 1004, the UE may refrain from responding to (e.g., acknowledging) the UE configuration update command. The UE may additionally not start its timer T3540.

Eventually, the T3555 timer may expire at the AMF, and in 1006, the AMF may retry providing the UE configuration update command. In 1008, as the critical condition is still occurring at the UE in the illustrated scenario, the UE may again refrain from responding to/acknowledging the UE configuration update command or starting its timer T3540. At least according to some embodiments, the network may be configured to retransmit the configuration update command up to four times, after which the procedure may be aborted. In such an instance, the network may determine to attempt such a procedure again at a later time, among various possibilities.

At some point, the critical condition occurring at the UE may end. In the illustrated scenario, in 1010, the AMF may retransmit the UE configuration update command message after the critical condition has ended. In 1012, since the critical condition is no longer in effect, the UE may respond to/acknowledge the UE configuration update command. In 1014, the AMF may follow up with a NAS signaling release message. In 1016, the UE may transmit a registration request with updated NSSAI and GUTI information (e.g., in accordance with the UE configuration update).

Thus, by using such a mechanism for delaying re-registration during critical conditions, it may be possible to avoid or at least reduce the likelihood of interrupting important operations at a UE.

In the following further exemplary embodiments are provided.

One set of embodiments may include a method, comprising: by a wireless device: registering for cellular service with a cellular network; receiving a configuration update command from a network element of the cellular network, wherein the configuration update command requests re-registration of the wireless device; and determining to delay responding to the configuration update command based at least in part on one or more conditions in effect at the wireless device.

According to some embodiments, the method further comprises: determining that the one or more conditions are no longer in effect at the wireless device; and responding to the configuration update command after the one or more conditions are no longer in effect at the wireless device.

According to some embodiments, the wireless device is configured to delay re-registration while one or more communication activity types are occurring; wherein the one or more conditions in effect at the wireless device comprise the specified communication activity types.

According to some embodiments, one or more conditions in effect at the wireless device comprise an active emergency call.

Another set of embodiments may include a method, comprising: by a cellular network element of a cellular network: determining to provide a configuration update command to the wireless device, wherein the configuration update command requests re-registration of the wireless device; determining one or more communication activity types currently being performed by the wireless device; and delaying providing the configuration update command to the wireless device based at least in part on one or more communication activity types currently being performed by the wireless device.

According to some embodiments, the method further comprises: receiving configuration information indicating to delay re-registration of wireless devices that are performing one or more communication activity types specified as critical communication activity types, wherein the one or more communication activity types currently being performed by the wireless device comprise at least one critical communication activity type.

According to some embodiments, the method further comprises: determining, at a later time, that no critical communication activity types are currently being performed by the wireless device; and providing the configuration update command to the wireless device based at least in part on determining that no critical communication activity types are currently being performed by the wireless device.

According to some embodiments, the one or more communication activity types currently being performed by the wireless device comprise an active emergency call, wherein delaying providing the configuration update command to the wireless device is based at least in part on the active emergency call.

Another exemplary embodiment may include a device, comprising: an antenna; a radio coupled to the antenna; and a processing element operably coupled to the radio, wherein the device is configured to implement any or all parts of the preceding examples.

A yet further exemplary embodiment may include a non-transitory computer accessible memory medium comprising program instructions which, when executed at a device, cause the device to implement any or all parts of any of the preceding examples.

A still further exemplary embodiment may include a computer program comprising instructions for performing any or all parts of any of the preceding examples.

Yet another exemplary embodiment may include an apparatus comprising means for performing any or all of the elements of any of the preceding examples.

Still another exemplary embodiment may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a network element 500) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
by a wireless device:
registering for cellular service with a cellular network;
receiving a configuration update command from a network element of the cellular network, wherein the configuration update command requests re-registration of the wireless device and includes updated allowed or configured network slice selection assistance information (NSSAI) for the wireless device; and
determining to delay the re-registration in accordance with the configuration update command based at least in part on one or more conditions in effect at the wireless device, wherein to delay the re-registration, the method further comprises:
refraining from transmitting an acknowledgement of the configuration update command while the one or more conditions remain in effect at the wireless device, wherein said refraining from transmitting an acknowledgement of the configuration update command occurs while a timer associated with the acknowledgement of the configuration update command is pending;
determining that the one or more conditions are no longer in effect at the wireless device; and transmitting, based on determining that the one or more conditions are no longer in effect at the wireless device, the acknowledgement of the configuration update command.

2. The method of claim 1,
wherein the wireless device is configured to delay re-registration while one or more communication activity types are occurring;
wherein the one or more conditions in effect at the wireless device comprise at least one of the one or more communication activity types occurring.

3. The method of claim 2, further comprising:
determining that at least one protocol data unit session associated with a communication activity type for which the wireless device is not configured to delay re-registration is active at the wireless device; and
release the at least one protocol data unit session associated with a communication activity type for which the wireless device is not configured to delay re-registration in response to receiving the configuration update command.

4. The method of claim 1,
wherein the one or more conditions in effect at the wireless device comprise one or more protocol data unit sessions for emergency services.

5. The method of claim 4, further comprising:
deactivating at least one protocol data unit session that is not for emergency services in response to receiving the configuration update command.

6. The method of claim 1, further comprising:
receiving a retransmission of the configuration update command, wherein transmitting the acknowledgement is in response to the retransmission.

7. The method of claim 1, wherein transmitting the acknowledgement is in response to expiration of a timer associated with delaying re-registration.

8. A wireless device, comprising:
an antenna;
a radio coupled to the antenna; and
a processing element coupled to the radio;
wherein the wireless device is configured to:
register for cellular service with a cellular network;
receive a configuration update command, different from de-registration and detach requests, from a network element of the cellular network, wherein the configuration update command requests re-registration of the wireless device and includes updated allowed or configured network slice selection assistance information (NSSAI) for the wireless device;
determine that one or more protocol data unit (PDU) sessions associated with emergency service are in effect at the wireless device;
refrain from performing re-registration based on the determination that the one or more PDU sessions associated with emergency service are in effect at the wireless device; and
perform re-registration in accordance with the configuration update command, wherein timing of the re-registration is based at least in part on whether the one or more PDU sessions associated with emergency service causing the wireless device to delay the re-registration remain in effect at the wireless device.

9. The wireless device of claim 8, wherein, based on the determination that the one or more PDU sessions associated with emergency service causing the wireless device to delay re-registration are in effect at the wireless device, the wireless device is further configured to:
determine when the one or more PDU sessions associated with emergency service are no longer in effect at the wireless device; and
perform re-registration in accordance with the configuration update command after the one or more PDU sessions associated with emergency service are no longer in effect at the wireless device.

10. The wireless device of claim 8, wherein, if no PDU sessions associated with emergency service are in effect at the wireless device, the wireless device is further configured to:
perform re-registration in accordance with the configuration update command immediately after receiving the configuration update command.

11. The wireless device of claim 8, wherein the wireless device is further configured to:
determine that at least one protocol data unit session not associated with emergency service is active at the wireless device; and
release the at least one protocol data unit session not associated with emergency service immediately in response to receiving the configuration update command.

12. The wireless device of claim 8, wherein the wireless device is further configured to:
initiate a timer associated with delaying re-registration; and
perform re-registration in accordance with the configuration update command after the timer expires even if the one or more PDU sessions associated with emergency service are still in effect at the wireless device.

13. A cellular network element of a cellular network, comprising:
a network interface; and
a processing element communicatively coupled to the network interface;
wherein the cellular network element is configured to:
determine to provide a configuration update command to a wireless device, wherein the configuration update command requests re-registration of the wireless device and includes updated allowed or configured network slice selection assistance information (NSSAI) for the wireless device;
determine two or more communication activity types currently being performed by the wireless device, wherein the two or more communication activity types currently being performed by the wireless device include at least:
a first critical communication activity type; and
a second non-critical communication activity type;
delay, for a first delay period, providing the configuration update command to the wireless device based at least in part on the determination that the two or more communication activity types currently being performed by the wireless device include the first critical communication activity type;
deactivate at least one protocol data unit (PDU) session associated with the second non-critical communication activity type; and
after the first delay period, provide the configuration update command to the wireless device.

14. The cellular network element of claim 13, wherein the cellular network element is further configured to:
receive configuration information indicating to delay re-registration of wireless devices that are performing one or more communication activity types specified as critical communication activity types.

15. The cellular network element of claim 14, wherein the cellular network element is further configured to:
   determine, after the first delay period, that the first critical communication activity type is no longer currently being performed by the wireless device, wherein providing the configuration update command to the wireless device is based at least in part on determining that the first critical communication activity type is no longer currently being performed by the wireless device.

16. The cellular network element of claim 14, wherein the cellular network element is further configured to:
   initiate a timer associated with delaying providing the configuration update command to the wireless device; and
   retransmit the configuration update command after the timer expires even if at least one critical communication activity type is being performed by the wireless device.

17. The cellular network element of claim 13,
   wherein the first critical communication activity type includes an active emergency call.

18. The cellular network element of claim 13,
   wherein the cellular network element comprises an access and mobility function (AMF) of a fifth generation new radio (5G NR) cellular network.

19. The wireless device of claim 8, wherein the wireless device is further configured to:
   receive a retransmission of the configuration update command; and
   determine that the one or more PDU sessions associated with emergency service are no longer in effect at the wireless device, wherein the acknowledgement is in response to the retransmission and the determination that the one or more conditions are no longer in effect at the wireless device.

20. The wireless device of claim 8, wherein the wireless device is further configured to:
   deactivate, in response to the configuration update command and prior to transmitting a registration request, at least one protocol data unit session that is not associated with emergency service.

* * * * *